C. D. VINCENT.
AUXILIARY STEAM INTAKE FOR INTAKE MANIFOLDS.
APPLICATION FILED MAR. 29, 1917.
1,253,910.  Patented Jan. 15, 1918.
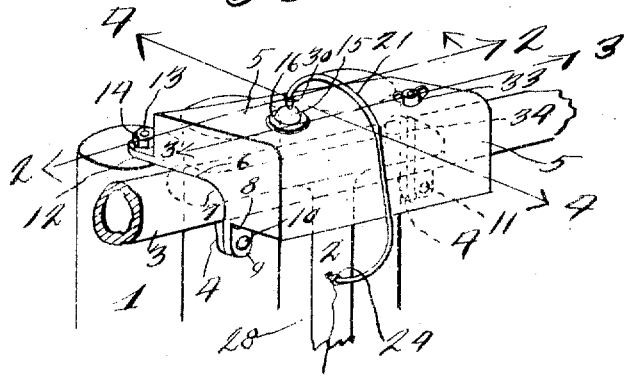
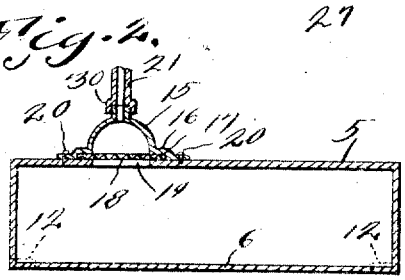
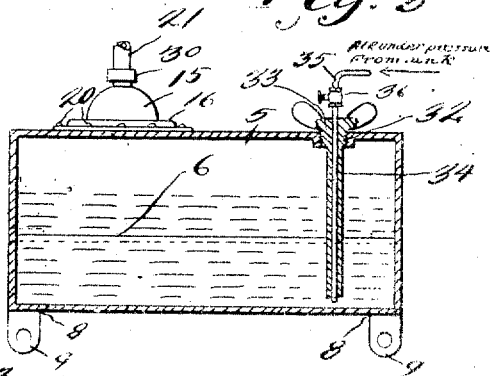
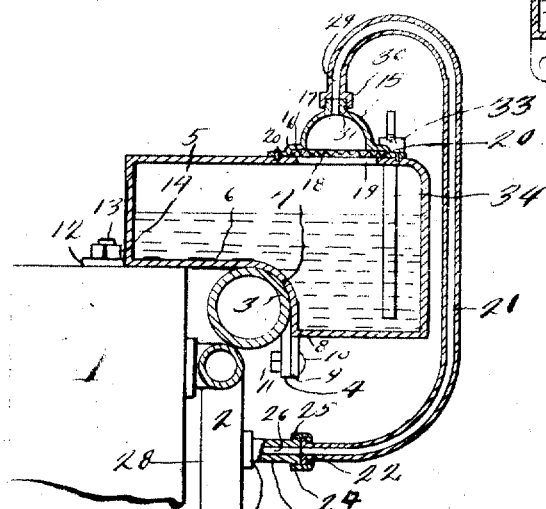

UNITED STATES PATENT OFFICE.

CLARENCE D'VINCENT, OF ROGERS, MICHIGAN.

AUXILIARY STEAM-INTAKE FOR INTAKE-MANIFOLDS.

1,253,910.   Specification of Letters Patent.   Patented Jan. 15, 1918.

Application filed March 29, 1917. Serial No. 158,299.

*To all whom it may concern:*

Be it known that I, CLARENCE D'VINCENT, a citizen of the United States, residing at Rogers, in the county of Presque Isle, State of Michigan, have invented a new and useful Auxiliary Steam-Intake for Intake-Manifolds; and I do hereby declare the following to be a full, clear, and exact description of the invention, such as will enable others skilled in the art to which it appertains to make and use the same.

This invention relates to an improved auxiliary steam and air intake for intake manifolds of internal combustion engines, and though the device is more especially adapted for use in connection with Ford automobile engines and manifolds, it may be used in connection with other types of engines and manifolds.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in perspective of a portion of an internal combustion engine, the manifold thereof showing the auxiliary steam intake device applied.

Fig. 2 is a sectional view on line 2—2 of Fig. 1, through the tank or casing, wherein water is heated for the generation of steam.

Fig. 3 is a sectional view on line 3—3 of Fig. 1.

Fig. 4 is a sectional view on line 4—4 of Fig. 1, at right angles to Figs. 2 and 3.

This improved auxiliary steam and air intake or injecting device may be applied to the usual or any conventional construction of engine cylinder and exhaust and intake manifolds. For illustrative purposes, 1 designates the engine cylinders, 2 the intake manifold, and 3 the exhaust manifold, which are of the general conventional outline, and their arrangements may be obviously changed or altered. However, the exhaust manifold is provided with attaching ears 4, which may be arranged at any suitable locations. The auxiliary steam heater comprises the casing or tank 5, which may be any suitable or conventional shape and design. Preferably the lower wall 6 of the casing may be formed or shaped, for instance as shown at 7, to conform to the contour of the exhaust manifold, or may be otherwise constructed. Carried by the lower wall, as shown at 8, are attaching ears or lugs 9, to be secured to the attaching ears or lugs 4, by means of screw bolts and nuts 10 and 11 thereby securely fastening the casing or tank detachably to the exhaust manifold. Carried by one of the side walls of the casing or tank, are additional attaching lugs or ears 12, provided with perforations to receive and be secured to the studs 13 by means of the nuts 14. The studs may be arranged at any suitable locations on the cylinder heads.

Preferably, a semi-spherical steam dome 15 is provided, which dome is supplied with a marginal annular flange 16. By means of the flange an annular recess 17 is afforded for the reception of a filtering screen 18, which may be constructed of any suitable wire fabric. The opening 19 in the upper wall of the casing or tank is of a less diameter than the annular wall of the recess 17, whereby, when the steam dome is in position, said fabric filter or screen is supported in position in the recess 17. This flange 16 receives securing screws or bolts 20 (which are threaded into the upper wall of the casing or tank) whereby the steam dome is fastened in place securely. The dome may be otherwise constructed and attached, just so long as it constitutes a space for the collection of the steam arising from the water, which becomes thoroughly heated from the heat radiating from the exhaust manifold and the heated cylinders, for instance, to the extent of boiling.

A steam conveying pipe 21 has its flanged end 22 connected to a suitable nipple or similar device 23, by means of a fitting or coupling member 24. This coupling member or fitting 24 so engages and coöperates with the flange of the end 22 of the pipe 21, and is threaded to the nipple, as at 25, as to hold the pipe 21 in its proper position. The nipple 23 (which is provided with a suitable passage 26) is threaded into or otherwise connected to the flanged opening 27 of the body portion 28 of the intake manifold. The other end 29 of the pipe 21 terminates in a flange part 30, which is threaded, or may be otherwise connected to the extension 31 of the steam dome 15, whereby the steam that collects in the dome may pass through the pipe 21 into the intake manifold, and mix with the charge during its passage through the manifold, whereby the combustion chambers of the cylinders may receive a charge more thoroughly volatilized or vaporized, hence, increasing the speed of the engine and practically eliminating all carbon deposits, as well as keeping the spark plugs clean. The upper wall of the casing or tank has a threaded filling opening 32, whereby, when the threaded plug 33 is removed, the tank or casing may be refilled with water. The plug 32 has a tubular extension 34 of such a length as to extend downwardly approximately to the bottom of the tank. Extending through the tubular extension is a pipe 35, which may be of any suitable length, and is designed to extend from and communicate with a suitable tank (not shown) containing air under pressure. Therefore, by controlling the valve 36 in the pipe 35 in any suitable manner (not shown) varied quantities of air may be allowed to pass into the tank or casing 5, hence, percolate upwardly through the water, become heated, and mix with the steam, which combination of steam and air, will more thoroughly refine and volatilize the charge. By virtue of the present device for additionally and thoroughly refining and vaporizing the charge, less fuel may be employed, thereby increasing the mileage per gallon of the fuel. However, the pipe 35 and the air under pressure may be dispensed with, and in lieu thereof only utilize the air that may naturally pass through the extension 34. The plug and its extension 34 may be otherwise constructed than that shown in the drawing.

The invention having been set forth, what is claimed as new and useful is:—

In a device as set forth, the combination with the cylinders of an internal combustion engine, of the intake and exhaust manifolds thereof, a water casing having its under wall constructed to conform to the cross section curvature of the exhaust manifold and partially lap the upper ends of the cylinders of the engine, means for securing the casing to the exhaust manifold and the cylinders, whereby the water in the casing may receive heat direct from the manifold and the engine, a steam dome on the top of the casing and in communication therewith, filtering means between the dome and the casing, whereby the steam is filtered as it passes into the dome, a pipe of communication between the dome and the intake manifold of the cylinders, whereby a mixture of steam and air may enter the intake manifold and mix with and volatilize the charge during its passage into the cylinders, said casing having a filling opening, a tubular member threaded in said opening and having its lower end terminating close to the bottom of the casing, and a pipe telescoping through said tubular opening to convey air under pressure to the undermost portion of the water in the casing, whereby the air may filter through the water and mix with the steam and pass through the dome and thence into the intake manifold.

In testimony whereof I have signed my name to this specification in the presence of two subscribing witnesses.

CLARENCE D'VINCENT

Witnesses:
 EUGENE D'VINCENT,
 JOHN FERDELMAN, Jr.